US012187826B2

(12) United States Patent
Oka et al.

(10) Patent No.: US 12,187,826 B2
(45) Date of Patent: Jan. 7, 2025

(54) METHOD FOR PRODUCING MOLDED BODY

(71) Applicant: DIC Corporation, Tokyo (JP)

(72) Inventors: Kenichirou Oka, Sakura (JP); Hideki Torii, Sakura (JP); Yasuhiro Takada, Sakura (JP)

(73) Assignee: DIC Corporation, Tokyo (JP)

( * ) Notice: Subject to any disclaimer, the term of this patent is extended or adjusted under 35 U.S.C. 154(b) by 1131 days.

(21) Appl. No.: 16/493,892

(22) PCT Filed: Mar. 13, 2018

(86) PCT No.: PCT/JP2018/009659
§ 371 (c)(1),
(2) Date: Sep. 13, 2019

(87) PCT Pub. No.: WO2018/168828
PCT Pub. Date: Sep. 20, 2018

(65) Prior Publication Data
US 2021/0122849 A1    Apr. 29, 2021

(30) Foreign Application Priority Data
Mar. 14, 2017   (JP) ................. 2017-048491

(51) Int. Cl.
C08F 22/26    (2006.01)
B29C 35/08    (2006.01)
B29C 53/00    (2006.01)
B29C 53/02    (2006.01)
B29C 71/02    (2006.01)
C08J 7/04     (2020.01)
C08K 3/36     (2006.01)
C09D 7/61     (2018.01)
C09D 135/02   (2006.01)

(52) U.S. Cl.
CPC .......... C08F 22/26 (2013.01); B29C 35/0805 (2013.01); B29C 53/005 (2013.01); B29C 53/02 (2013.01); C08J 7/0427 (2020.01); C08J 7/08 (2013.01); C08K 3/36 (2013.01); C09D 7/61 (2018.01); C09D 135/02 (2013.01); B29K 2869/00 (2013.01); C08J 2369/00 (2013.01); C08J 2435/02 (2013.01)

(58) Field of Classification Search
CPC ... B29C 35/0805; B29C 53/005; B29C 53/02; B29K 2869/00
See application file for complete search history.

(56) References Cited

U.S. PATENT DOCUMENTS 6,306,502 B1   10/2001   Fukushima et al.

FOREIGN PATENT DOCUMENTS

| EP | 0 869 154 A1 | 10/1998 |
| JP | H10-060306 A | 3/1998 |
| JP | H11-077878 A | 3/1999 |
| JP | 2001-162717 A | 6/2001 |
| JP | 2009-024168 A | 2/2009 |
| JP | 2011-194756 A | 10/2011 |
| JP | 2014-000688 A | 1/2014 |
| JP | 2015-199921 A | 11/2015 |
| JP | 2017-065172 A | 4/2017 |
| JP | 2018-065967 A | 4/2018 |
| TW | 380152 B | 1/2000 |
| WO | 1997/011129 A1 | 3/1997 |

OTHER PUBLICATIONS

English language translation of JP2009024168 (Year: 2009).*
International Search Report mailed May 22, 2018, issued for PCT/JP2018/009659.
Office Action mailed Dec. 7, 2022, issued for CN202111477998.0.

* cited by examiner

Primary Examiner — Larry W Thrower
(74) Attorney, Agent, or Firm — Locke Lord LLP

(57) ABSTRACT

The present invention provides a method for producing a molded body, having the step 1 of applying a composition containing an alicyclic urethane (meth)acrylate to a thermoplastic resin substrate to obtain a coated material, the step 2 of irradiating the obtained coated material with an active energy ray to cure the composition, obtaining a laminated material having a cured product layer obtained from the cured composition, and the step 3 of subjecting the obtained laminated material to bending processing to obtain a molded body, wherein the alicyclic urethane (meth)acrylate has a structure having an alicyclic structure represented by the formula (A), and a group having two or more (meth)acryloyl groups represented by the formula (B), and further has a polymerizable double bond equivalent of 100 to 1,000 g/mol.

19 Claims, No Drawings

METHOD FOR PRODUCING MOLDED BODY

TECHNICAL FIELD

The present invention relates to a method for producing a molded body, which is advantageous not only in that the molded body has excellent hard coat properties, but also in that bending processing can be performed after curing.

BACKGROUND ART

Conventionally, molded bodies made of a resin have been used in interior automotive trims, such as an instrument cover, building materials for a carport, a sound barrier for expressway, and the like, resin window glass for automobile and the like, and components of display panels for OA machines and the like. Such members are required to be resistant to the use in the outdoor application, and therefore it is necessary that the member be a hard coat laminated material having applied onto the surface layer thereof a weathering-resistant hard coat having an abrasion resistance and a weathering resistance.

The hard coat laminated material is applied to not only the flat portion but also the curved portion of an object to be protected. However, the hard coat layer is hard and brittle for obtaining its hardness, and hence, with respect to the hard coat laminated material obtained after being cured, it is difficult to subject the laminated material to bending processing. For this reason, conventionally, only a forming method has been employed in which a substrate is subjected to bending processing to obtain a molded body, and then a hard coat layer is laminated on the molded body, and such a method has problems about the productivity and cost. Therefore, there is required a method for producing a molded body which has hard coat properties, and which can be subjected to bending processing even after being cured.

As a means for solving the problems, PTL 1 discloses a laminated material of a three-layer structure in which a layer having a specific Tg is disposed between a hard coat and a substrate. However, the produced laminated material must have a structure of three layers or more, and thus is poor in the productivity in relation to the coating, and therefore a laminated material having a two-layer structure including a substrate and achieving both the abrasion resistance and moldability is desired.

CITATION LIST

Patent Literature

PTL 1: JP-A-2014-688

SUMMARY OF INVENTION

Technical Problem

A task of the present invention is to provide a method for producing a molded body, which is advantageous not only in that the molded body has hard coat properties, but also in that bending processing can be performed even after curing.

Solution to Problem

The present inventors have conducted extensive and intensive studies. As a result, it has been found that the above-mentioned task can be achieved by providing a method for producing a molded body, which includes the step 1 of applying a composition containing an alicyclic urethane (meth)acrylate having an alicyclic skeleton and having a polymerizable double bond equivalent (g/mol) of 100 to 1,000 to a thermoplastic resin substrate to obtain a coated material, the step 2 of irradiating the obtained coated material with an active energy ray to cure the composition so that a laminated material is obtained which has a cured product layer obtained by curing the composition, and the step 3 of subjecting the obtained laminated material to bending processing to obtain a molded body.

Advantageous Effects of Invention

By the present invention, a molded body having excellent hard coat properties can be produced. Particularly, with respect to the coated material obtained by directly applying a hard coat layer to a substrate, even after the coated material is irradiated with an active energy ray to obtain a laminated material, the resultant laminated material can be subjected to processing, and therefore the method of the invention has especially excellent productivity and thus is excellent in the industrial applicability.

DESCRIPTION OF EMBODIMENTS

According to the present invention, there is provided a method for producing a molded body, including the step 1 of applying a composition containing an alicyclic urethane (meth)acrylate to a thermoplastic resin substrate to obtain a coated material, the step 2 of irradiating the obtained coated material with an active energy ray to cure the composition so that a laminated material is obtained which has a cured product layer obtained by curing the composition, and the step 3 of subjecting the obtained laminated material to bending processing to obtain a molded body, wherein the alicyclic urethane (meth)acrylate has a structure having an alicyclic structure represented by the formula (A), and a group having two or more (meth)acryloyl groups represented by the formula (B), and further has a polymerizable double bond equivalent of 100 to 1,000 g/mol.

<Step 1>

The step 1 in the invention is a step of applying a composition containing an alicyclic urethane (meth)acrylate to a thermoplastic resin substrate to obtain a coated material.

(Alicyclic Urethane (Meth)Acrylate)

The composition in the invention contains an alicyclic urethane acrylate as an essential component.

The alicyclic urethane acrylate in the invention has a feature such that it has a structure having an alicyclic structure represented by the formula (A) below, and a group having two or more (meth)acryloyl groups represented by the formula (B) below, and further has a polymerizable double bond equivalent of 100 to 1,000 g/mol:

[Chem. 1]

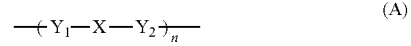

(A)

In the formula (A), X is at least one of alicyclic structures represented by the formula (1) below, each of $Y_1$ and $Y_2$ is independently a direct bond, a hydrocarbon group having 1 to 10 carbon atoms, an urethane linkage, an ether linkage, an amide linkage, or a carbonyl group, and n represents an integer of 1 to 6.

[Chem. 2]

(1)

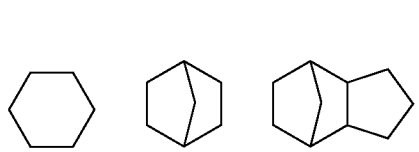

In the formula (1), each alicyclic structure optionally has a substituent.

[Chem. 3]

(B)

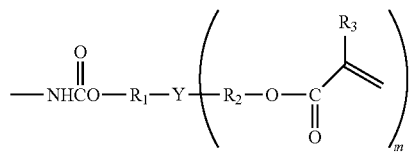

In the general formula (B), $R_1$ is a direct bond or a divalent linking group, Y is a direct bond or a carbon atom, $R_2$ is a direct bond, a hydrocarbon group having 1 to 3 carbon atoms, or a carbonyl group, $R_3$ is a hydrogen atom or a methyl group, and m represents an integer of 1 to 3.

In the general formula (B) above, examples of the divalent linking groups include a hydrocarbon group having 1 to 10 carbon atoms, an amide linkage, an ether linkage, a carbonyl group, and a combination thereof.

Y is a direct bond or a carbon atom. The carbon atom may have a hydrogen atom replaced by a substituent, and, as the substituent, there can be mentioned a hydrocarbon group having 1 to 10 carbon atoms.

The alicyclic urethane acrylate in the invention has a polymerizable double bond equivalent of 100 to 1,000 g/mol. The reason for this is as follows. When the polymerizable double bond equivalent of the alicyclic urethane acrylate is 100 or less, an abrasion resistance is exhibited, but a flex resistance is not exhibited, and, when the polymerizable double bond equivalent is 1,000 or more, a flex resistance is exhibited, but an abrasion resistance is not exhibited. The polymerizable double bond equivalent of the alicyclic urethane acrylate is preferably 100 to 850, and, when the polymerizable double bond equivalent is in this range, both an abrasion resistance and a flex resistance can be advantageously achieved. The polymerizable double bond equivalent of the alicyclic urethane acrylate is especially preferably 100 to 650.

The polymerizable double bond equivalent in the invention is determined by making a calculation using the formula below wherein M is an average weight of molecules having a polymerizable double bond, and N is an average double bond number in the molecules having a polymerizable double bond.

Polymerizable double bond equivalent=$M/N$

With respect to the alicyclic urethane (meth)acrylate in the invention, for example, there can be mentioned structures represented by the following general formulae (I) to (VI).

[Chem. 4]

(I)

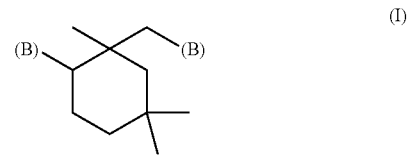

[Chem. 5]

(II)

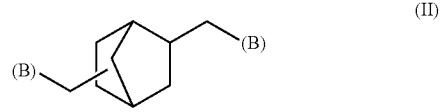

[Chem. 6]

(III)

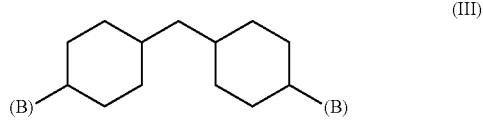

[Chem. 7]

(IV)

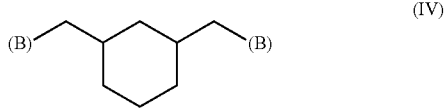

[Chem. 8]

(V)

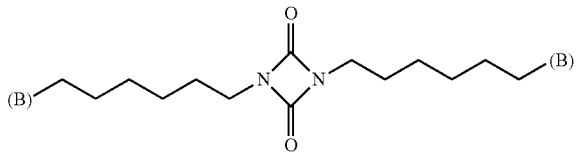

[Chem. 9]

(VI)

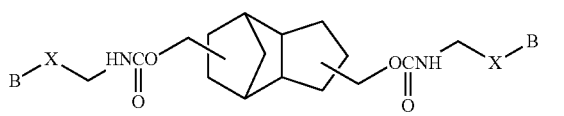

With respect to the alicyclic urethane (meth)acrylate in the invention, as examples of preferred structures, there can be mentioned the following structures.

[Chem. 10]
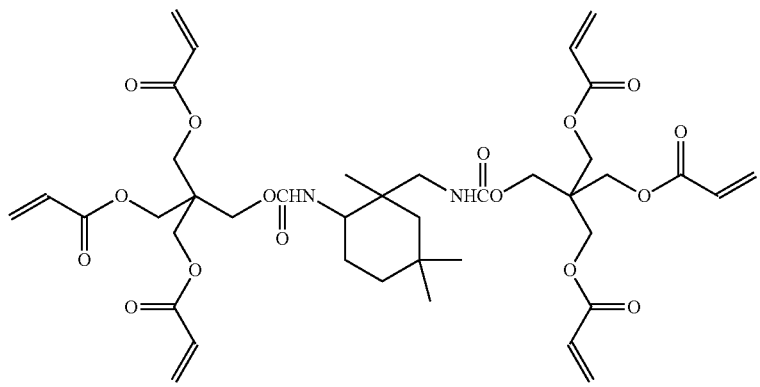
[Chem. 11]
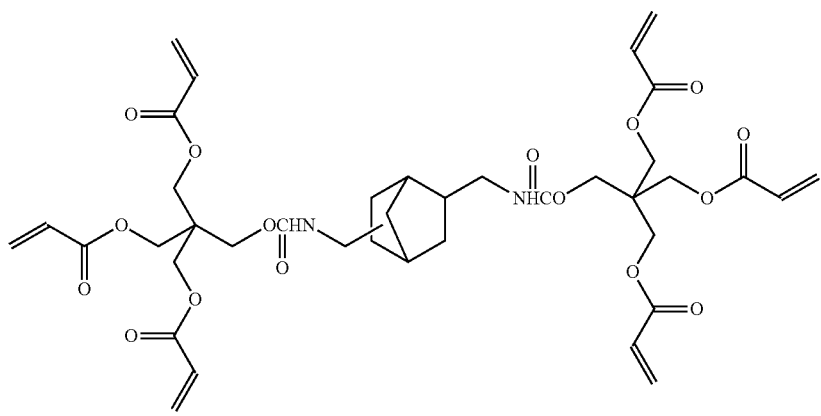
[Chem. 12]
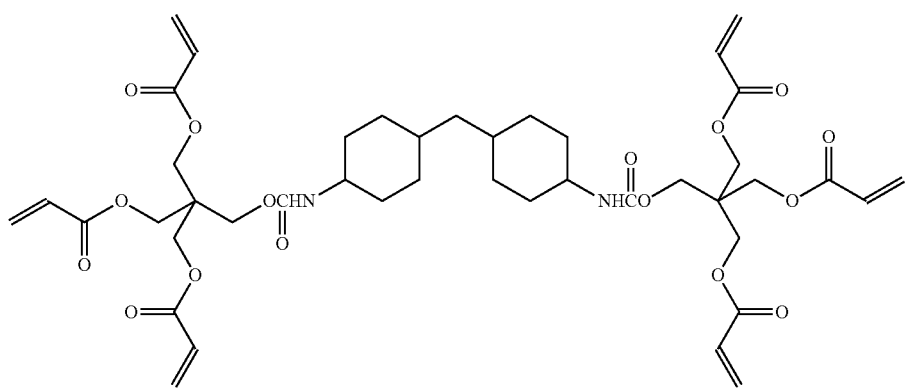

[Chem. 13]

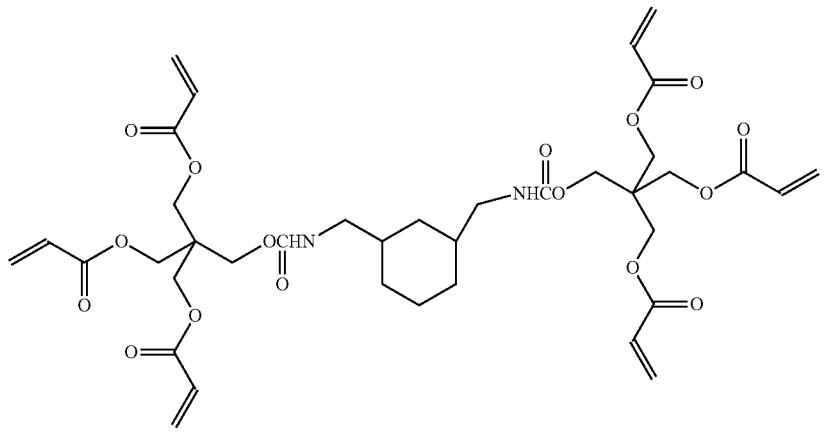

[Chem. 14]

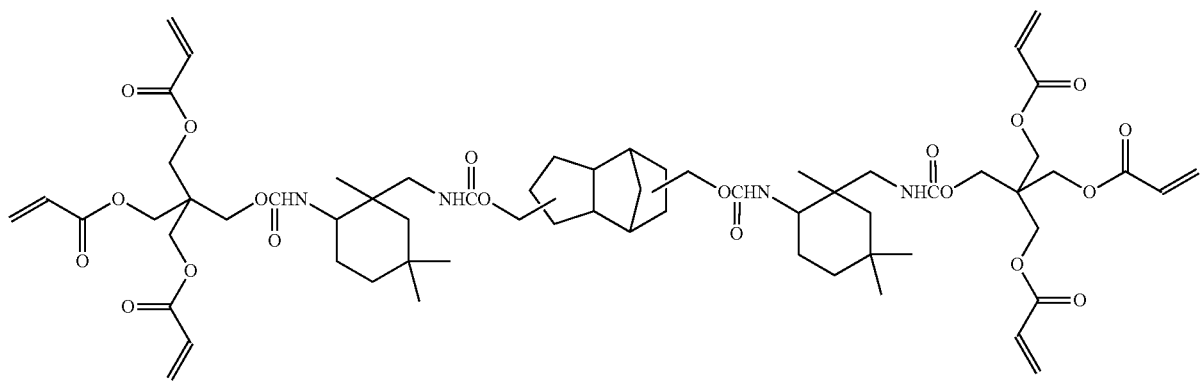

[Chem. 15]

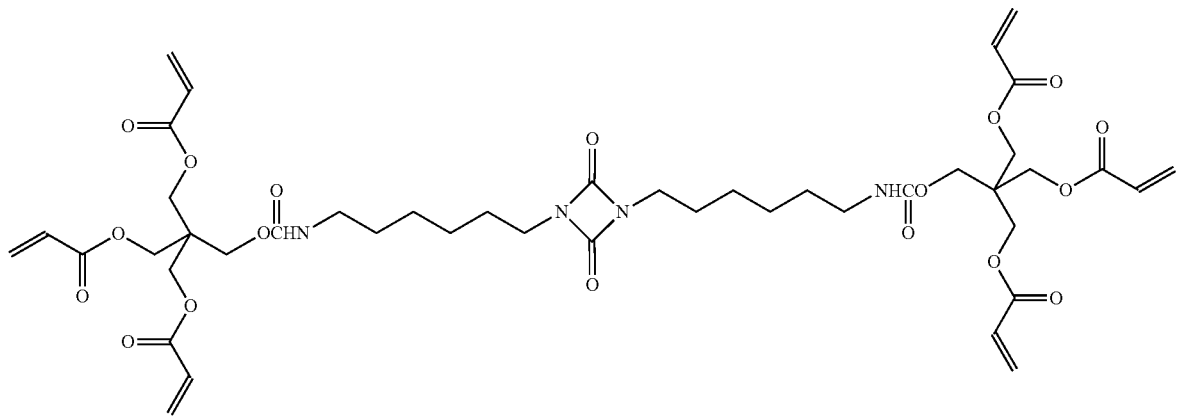

(Compound Having a Polymerizable Double Bond)

The composition in the invention may contain a compound having a polymerizable double bond other than the alicyclic urethane (meth)acrylate in the invention. With respect to the compound having a polymerizable double bond, there is no particular limitation as long as it has a polymerizable double bond, and the compound may be any of a monomer, an oligomer, a macromonomer, and a polymer.

Examples of polymerizable double bonds include a vinyl group and a (meth)acryloyl group, and a compound having such a group is the compound having a polymerizable double bond. Examples of the compounds having a polymerizable double bond include vinyl compounds and (meth)acryloyl compounds.

Examples of vinyl compounds include styrene monomers, such as styrene, α-methylstyrene, vinyltoluene, and chlorostyrene; vinyl esters, such as vinyl acetate; (meth)acrylamide; (meth)acrylonitrile; N-alkoxy-substituted (meth)acrylamides, such as N-methoxymethylacrylamide and N-ethoxymethylacrylamide; unsaturated basic monomers; and maleimide monomers, such as N-phenylmaleimide, N-cyclohexylmaleimide, and N-isopropylmaleimide.

Examples of (meth)acryloyl compounds include monofunctional (meth)acrylates and polyfunctional (meth)acrylates.

Examples of monofunctional (meth)acrylates include hydroxyl group-containing (meth)acrylates, such as hydroxyethyl (meth)acrylate, hydroxypropyl (meth)acrylate, hydroxybutyl (meth)acrylate, caprolactone-modified hydroxy(meth)acrylate (for example, trade name "Placcel", manufactured by Daicel Corporation), mono(meth)acrylate of polyester diol obtained from phthalic acid and propylene glycol, mono(meth)acrylate of polyester diol obtained from succinic acid and propylene glycol, polyethylene glycol mono(meth)acrylate, polypropylene glycolmono(meth)acrylate, pentaerythritol tri(meth)acrylate, 2-hydroxy-3-(meth)acryloyloxypropyl (meth)acrylate, and (meth)acrylic acid addition products of various epoxy esters; carboxyl group-containing vinyl monomers, such as (meth)acrylic acid, crotonic acid, itaconic acid, maleic acid, and fumaric acid; sulfonic group-containing vinyl monomers, such as vinylsulfonic acid, styrenesulfonic acid, and sulfoethyl (meth)acrylate; acid phosphate vinyl monomers, such as 2-(meth)acryloyloxyethyl acid phosphate, 2-(meth)acryloyloxypropyl acid phosphate, 2-(meth)acryloyloxy-3-chloropropyl acid phosphate, and 2-methacryloyloxyethylphenyl phosphate; and vinyl monomers having a methylol group, such as N-methylol(meth)acrylamide.

Examples of polyfunctional monomers and polyfunctional oligomers include 1,4-butanediol di(meth)acrylate, 1,6-hexanediol di(meth)acrylate, 1,9-nonanediol di(meth)acrylate, neopentyl glycol di(meth)acrylate, glycerol tri(meth)acrylate modified with ethylene oxide, glycerol tri(meth)acrylate modified with propylene oxide, trimethylolpropane tri(meth)acrylate, hydroxypivalic acid-modified trimethylolpropane tri(meth)acrylate, trimethylolpropane tri(meth)acrylate modified with ethylene oxide, trimethylolpropane tri(meth)acrylate modified with propylene oxide, phosphoric acid tri(meth)acrylate modified with ethylene oxide, pentaerythritol ethoxytetra(meth)acrylate, pentaerythritol tri(meth)acrylate, dipentaerythritol tri(meth)acrylate, dipentaerythritol tetra(meth)acrylate, dipentaerythritol penta(meth)acrylate, dipentaerythritol hexa(meth)acrylate, tripentaerythritol tetra(meth)acrylate, tripentaerythritol penta(meth)acrylate, tripentaerythritol hexa(meth)acrylate, tripentaerythritol hepta(meth)acrylate, tripentaerythritol octa(meth)acrylate, dipentaerythritol hexa(meth)acrylate modified with ethylene oxide, dipentaerythritol hexa(meth)acrylate modified with propylene oxide, an urethane (meth)acrylate compound obtained by reacting an isocyanate compound and an alcohol compound, a polyester (meth)acrylate compound synthesized by a condensation reaction of a polyhydric alcohol, (meth)acrylic acid, and a polyfunctional carboxylic acid, and an epoxy (meth)acrylate compound synthesized by an addition reaction of a bisphenol epoxy resin or a novolak epoxy resin and (meth)acrylic acid.

These compounds having a polymerizable double bond may be used individually or in combination.

(Isocyanurate Skeleton-Containing (Meth)Acrylate Having an Isocyanurate Skeleton and Having a Polymerizable Double Bond Equivalent of 100 to 1,000 g/mol)

Further, in the composition in the invention, it is preferred that the compound having a polymerizable double bond contains an isocyanurate skeleton-containing (meth)acrylate having an isocyanurate skeleton and having a polymerizable double bond equivalent of 100 to 1,000 g/mol. By virtue of containing the isocyanurate skeleton-containing (meth)acrylate in the invention, the abrasion resistance and the flex resistance are further improved.

The isocyanurate skeleton-containing (meth)acrylate in the invention has a feature such that it has an isocyanurate skeleton and has a polymerizable double bond equivalent of 100 to 1,000 g/mol. The polymerizable double bond equivalent is determined by making a calculation using the formula below wherein M is an average weight of molecules having a polymerizable double bond, and N is an average double bond number in the molecules having a polymerizable double bond.

Polymerizable double bond equivalent=$M/N$

The isocyanurate skeleton-containing (meth)acrylate in the invention is an isocyanurate ring-containing tri(meth)acrylate compound represented by the following general formula (1):

[Chem. 16]

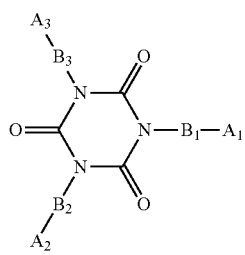

(1)

In the formula (1), $A_1$, $A_2$, and $A_3$ represent an acryloyl group ($CH_2$=CH—CO—), an acryloyl group modified with caprolactone [($CH_2$=CH—CO(O($CH_2$)$_5$C=O)a-) wherein a is an integer of 1 or more], a hydrogen atom, or an alkyl group, wherein at least two of these are an acryloyl group or an acryloyl group modified with caprolactone, and $B_1$, $B_2$, and $B_3$ represent an oxyalkylene group or a polyoxyalkylene group.

These isocyanurate skeleton-containing (meth)acrylates may be used individually or in combination.

Specific examples of the isocyanurate skeleton-containing (meth)acrylates in the invention include tris(2-acryloyloxyethyl) isocyanurate, tris(2-acryloyloxypropyl) isocyanurate, tris(2-acryloyloxyethyl) isocyanurate modified with one caprolactone per molecule (trade name "ARONIX M-325", manufactured by Toagosei Co., Ltd.), and tris(2-acryloyloxyethyl) isocyanurate modified with three caprolactones per molecule (trade name "ARONIX M-327", manufactured by Toagosei Co., Ltd.).

(Isocyanurate Skeleton-Containing Urethane (Meth)Acrylate)

The isocyanurate skeleton-containing (meth)acrylate in the invention is preferably an isocyanurate skeleton-containing urethane (meth)acrylate having an urethane linkage. The reason for this is that, by virtue of having an urethane linkage, the moldability and the weathering resistance are further improved without sacrificing the abrasion resistance.

It is especially preferred that an isocyanurate skeleton-containing urethane (meth)acrylate having an urethane linkage and an isocyanurate skeleton-containing (meth)acrylate having no urethane linkage are used in combination, and, in this case, excellent balance between the moldability and the weathering resistance is obtained.

When the isocyanurate skeleton-containing (meth)acrylate in the invention is an urethane (meth)acrylate, specifically, there can be mentioned an urethane (meth)acrylate obtained by reacting a polyisocyanate compound having an isocyanurate skeleton on the structure thereof and a polyol.

The polyisocyanate compound may be a polyisocyanate compound having an isocyanurate skeleton on the structure thereof, and, for example, there can be mentioned a trimer of diisocyanate. Examples of the diisocyanates include hexamethylene diisocyanate, phenylene diisocyanate, toluene diisocyanate, 4,4'-diphenylmethane diisocyanate, and isophorone diisocyanate. Further, a polyisocyanate obtained by reacting a trimer of the above diisocyanate and a polyol can be used as the polyisocyanate compound (a1). Examples of the polyols include aliphatic diols, such as 2,2,4-trimethyl-1,3-pentanediol, 1,3-hexanediol, and 1,6-hexanediol, polyethylene glycol, polypropylene glycol, and a dimer of an unsaturated aliphatic alcohol. Further, a compound obtained by modifying the above polyol with a lactone may be used. Further, these polyisocyanate compounds can be used individually or in combination.

For obtaining more excellent abrasion resistance and flex resistance, a polyisocyanate compound containing a trimer of hexamethylene diisocyanate is preferred.

(Lactone-Modified Isocyanurate Skeleton-Containing (Meth)Acrylate)

The isocyanurate skeleton-containing (meth)acrylate in the invention may be a lactone-modified isocyanurate (meth)acrylate which is modified with lactone. By modification with lactone, the flex resistance can be further improved without sacrificing the hard coat properties, particularly abrasion resistance.

Examples of the lactone-modified isocyanurate (meth)acrylates include ones which are obtained by reacting a polyisocyanate compound having an isocyanurate skeleton on the structure thereof and a lactone-modified polyol, or by reacting a lactone-modified polyisocyanate and a polyol. The polyisocyanate compound may be a polyisocyanate compound having an isocyanurate skeleton on the structure thereof, and these polyisocyanate compounds can be used individually or in combination. Examples of the polyols include aliphatic diols, such as 2,2,4-trimethyl-1,3-pentanediol, 1,3-hexanediol, and 1,6-hexanediol, polyethylene glycol, polypropylene glycol, and a dimer of an unsaturated aliphatic alcohol. Further, a compound obtained by modifying the above polyol with a lactone may be used. Further, these polyisocyanate compounds can be used individually or in combination.

For obtaining more excellent abrasion resistance and flex resistance, a polyisocyanate compound containing a trimer of hexamethylene diisocyanate is preferred.

(Amounts of the Components Incorporated)

When the composition in the invention contains the compound having a polymerizable double bond and the alicyclic urethane (meth)acrylate, in view of achieving both excellent flex resistance and excellent abrasion resistance, the proportion of the alicyclic urethane (meth)acrylate in the total weight of the compound having a polymerizable double bond and the alicyclic urethane (meth)acrylate is desirably 5 to 100 wt %, more preferably 10 to 95 wt %, especially preferably 20 to 90 wt %.

Further, when the composition in the invention contains an isocyanurate skeleton-containing (meth)acrylate, the amount of the isocyanurate skeleton-containing (meth)acrylate is preferably 1 to 95 wt %, more preferably 5 to 80 wt %, especially preferably 10 to 70 wt %, based on the total weight of the compound having a polymerizable double bond and the alicyclic urethane (meth)acrylate.

Further, when the isocyanurate skeleton-containing (meth)acrylate in the invention contains an isocyanurate skeleton-containing urethane (meth)acrylate, the proportion of the isocyanurate skeleton-containing urethane (meth)acrylate in the total weight of the isocyanurate skeleton-containing (meth)acrylates is preferably 5 to 100 wt %, more preferably 10 to 80 wt %, especially preferably 20 to 70 wt %.

(Silica)

For the purpose of improving the hard coat properties, silica is preferably incorporated into the composition in the invention.

With respect to the silica, there is no particular limitation, known silica fine particles, such as silica in a powder form or colloidal silica, can be used. Examples of commercially available silica fine particles in a powder form include Aerosil 50, 200, manufactured by Nippon Aerosil Co., Ltd.; Sildex H31, H32, H51, H52, H121, H122, manufactured by Asahi Glass Co., Ltd.; E220A, E220, manufactured by Nippon Silica Industrial Co.; SYLYSIA 470, manufactured by Fuji Silysia Chemical Ltd.; and SG Flake, manufactured by Nippon Sheet Glass Co., Ltd.

Further, examples of commercially available colloidal silica include methanol silica sol, IPA-ST, MEK-ST, NBA-ST, XBA-ST, DMAC-ST, ST-UP, ST-OUP, ST-20, ST-40, ST-C, ST-N, ST-O, ST-50, ST-OL, manufactured by Nissan Chemical Industries, Ltd.

As the silica, reactive silica may be used. As an example of reactive silica, there can be mentioned reactive compound-modified silica. Examples of reactive compounds include a reactive silane coupling agent having a hydrophobic group, a compound having a (meth)acryloyl group, a compound having a maleimide group, and a compound having a glycidyl group.

Examples of commercially available powder-form silica modified with a compound having a (meth)acryloyl group include Aerosil RM50, R711, manufactured by Nippon Aerosil Co., Ltd., and examples of commercially available colloidal silica modified with a compound having a (meth)acryloyl group include MIBK-SD, MIBK-SD-L, MEK-AC, PGM-AC, MIBK-AC, manufactured by Nissan Chemical Industries, Ltd. Further, examples of reactive silica include silica which is obtained by modifying it with a glycidyl group, and then subjecting the resultant silica to addition reaction of acrylic acid, such as 3-glycidoxypropyltrimethoxysilane, and silica which is modified with a product obtained by subjecting 3-isocyanatopropyltriethoxysilane and a compound having a hydroxyl group and a (meth)acryloyl group to urethane forming reaction.

With respect to the shape of the silica fine particles, there is no particular limitation, and those in a spherical, hollow, porous, rod, plate, fibrous, or indefinite shape can be used. For example, as commercially available hollow silica fine particles, SiliNax, manufactured by Nittetsu Mining Co., Ltd., or the like can be used.

Further, the average particle diameter of the silica fine particles is preferably in the range of from 5 to 200 nm. When the average particle diameter is 5 nm or more, dispersion of the inorganic fine particles in the composition becomes satisfactory, and, when the average particle diameter is 200 nm or less, a satisfactory strength of the cured product can be maintained.

The amount of the silica incorporated is preferably 3 to 60 parts by weight, relative to the total weight of the alicyclic urethane (meth)acrylate and the compound having a polymerizable double bond in the composition.

(Other Ingredients)

The composition in the invention may contain another ingredient. For example, various resins, a reactive compound, a catalyst, a polymerization initiator, an organic filler, an inorganic filler, an organic solvent, an inorganic pigment, an organic pigment, a loading pigment, a clay mineral, a wax, a surfactant, a stabilizer, a fluidity controlling agent, a coupling agent, a dye, a leveling agent, a rheology controlling agent, an ultraviolet light absorber, an antioxidant, or a plasticizer may be incorporated.

Examples of organic solvents include ester solvents, ketone solvents, ether solvents, aliphatic solvents, aromatic solvents, and alcohol solvents.

Specifically, examples of ester solvents include ethyl acetate, propyl acetate, and butyl acetate, examples of ketone solvents include acetone, 2-butanone, methylethylketone, and methyl isobutyl ketone, examples of ether solvents include tetrahydrofuran and dioxolane, examples of aliphatic solvents include hexane and cyclohexane, examples of aromatic solvents include toluene and xylene, and examples of alcohol solvents include ethanol, methanol, propanol, butanol, and propylene glycol monomethyl ether.

Further, for controlling the viscosity, an organic polymer in a liquid state may be used. The organic polymer in a liquid state means an organic polymer in a liquid state, which does not directly participate in the curing reaction, and, for example, there can be mentioned a carboxyl group-containing polymer modification product (FLOWLEN G-900, NC-500: Kyoeisha Chemical Co., Ltd.), an acrylic polymer (FLOWLEN WK-20: Kyoeisha Chemical Co., Ltd.), an amine salt of a specially modified phosphate (HIPLAAD ED-251: Kusumoto Chemicals Ltd.), and a modified acrylic block copolymer (DISPERBYK2000; BYK-Chemie).

With respect to various resins, a thermosetting resin or a thermoplastic resin can be used.

The thermosetting resin means a resin having such properties that it can be changed to be substantially insoluble and infusible upon being cured by a means, such as heating, radiation, or a catalyst. Specific examples of the thermosetting resin include resins having such properties that they can be changed to be substantially insoluble and infusible upon being cured by a means, such as heating, radiation, or a catalyst. Specific examples of thermosetting resins include a phenolic resin, an urea resin, a melamine resin, a benzoguanamine resin, an alkyd resin, an unsaturated polyester resin, a vinyl ester resin, a diallyl terephthalate resin, an epoxy resin, a silicone resin, an urethane resin, a furan resin, a ketone resin, a xylene resin, a thermosetting polyimide resin, a benzoxazine resin, an active ester resin, an aniline resin, a cyanate ester resin, and a styrene-maleic anhydride (SMA) resin. These thermosetting resins can be used individually or in combination.

The thermoplastic resin means a resin which can be melt-molded by heating. Specific examples of thermoplastic resins include a polyethylene resin, a polypropylene resin, a polystyrene resin, a rubber modified polystyrene resin, an acrylonitrile-butadiene-styrene (ABS) resin, an acrylonitrile-styrene (AS) resin, a polymethyl methacrylate resin, an acrylic resin, a polyvinyl chloride resin, a polyvinylidene chloride resin, a polyethylene terephthalate resin, an ethylene vinyl alcohol resin, a cellulose acetate resin, an ionomer resin, a polyacrylonitrile resin, a polyamide resin, a polyacetal resin, a polybutylene terephthalate resin, a polylactate resin, a polyphenylene ether resin, a modified polyphenylene ether resin, a polycarbonate resin, a polysulfone resin, a polyphenylene sulfide resin, a polyether imide resin, a polyether sulfone resin, a polyarylate resin, a thermoplastic polyimide resin, a polyamide-imide resin, a polyether ether ketone resin, a polyketone resin, a liquid crystalline polyester resin, a fluororesin, a syndiotactic polystyrene resin, and a cyclic polyolefin resin. These thermoplastic resins can be used individually or in combination.

The composition in the invention may contain a filler other than silica. Examples of fillers other than silica include inorganic fillers and organic fillers. With respect to the form of the filler, there is no particular limitation, and examples include fillers in a particle form, a plate form, or in a fiber form.

With respect to the inorganic fine particles, examples of those having excellent heat resistance include alumina, magnesia, titania, and zirconia; examples of those having excellent thermal conductivity include boron nitride, aluminum nitride, alumina oxide, titanium oxide, magnesium oxide, zinc oxide, and silicon oxide; examples of those having excellent electrical conductivity include a metallic filler and/or a metal-coated filler using a metal simple substance or alloy (for example, iron, copper, magnesium, aluminum, gold, silver, platinum, zinc, manganese, or stainless steel); examples of those having excellent barrier properties include minerals, such as mica, clay, kaolin, talc, zeolite, wollastonite, and smectite, potassium titanate, magnesium sulfate, sepiolite, xonotlite, aluminum borate, calcium carbonate, titanium oxide, barium sulfate, zinc oxide, and magnesium hydroxide; examples of those having a high refractive index include barium titanate, zirconia oxide, and titanium oxide; examples of those having photocatalytic properties include photocatalyst metals, such as titanium, cerium, zinc, copper, aluminum, tin, indium, phosphorus, carbon, sulfur, tellurium, nickel, iron, cobalt, silver, molybdenum, strontium, chromium, barium, and lead, composites of the above metals, and oxides thereof; examples of those having excellent abrasion resistance include metals, and composites and oxides thereof, such as alumina, zirconia, and magnesium oxide; examples of those having excellent electrical conductivity include metals, such as silver and copper, tin oxide, and indium oxide; and examples of those having excellent ultraviolet light screening properties include titanium oxide and zinc oxide.

These inorganic fine particles may be appropriately selected according to the application, and a single type of the inorganic fine particles may be used, or two or more types of the inorganic fine particles may be used in combination. Further, the inorganic fine particles have various properties other than the properties mentioned above, and therefore may be appropriately selected according to the application.

Examples of inorganic fibers include inorganic fibers, such as a carbon fiber, a glass fiber, a boron fiber, an alumina fiber, and a silicon carbide fiber, a carbon fiber, an activated carbon fiber, a graphite fiber, a glass fiber, a tungsten carbide fiber, a silicon carbide fiber, a ceramic fiber, an alumina fiber, natural fibers, mineral fibers, such as basalt, a boron fiber, a boron nitride fiber, a boron carbide fiber, and metallic fibers. Examples of the metallic fibers include an aluminum fiber, a copper fiber, a brass fiber, a stainless steel fiber, and a steel fiber.

Examples of organic fibers include synthetic fibers formed from a resin material, such as polybenzazole, aramid, PBO (polyparaphenylenebenzoxazole), polyphenylene sulfide, polyester, acryl, polyamide, polyolefin, polyvinyl alcohol, or polyarylate, natural fibers, such as cellulose, pulp, cotton, wool, and silk, and regenerated fibers, such as protein, polypeptide, and alginic acid.

The composition in the invention is cured using an active energy ray, and therefore a polymerization initiator, particularly a photopolymerization initiator is preferably used. As the photopolymerization initiator, a known photopolymerization initiator may be used, and, for example, at least one member selected from the group consisting of an acetophenone, a benzylketal, and a benzophenone can be preferably used. Examples of the acetophenones include diethoxyacetophenone, 2-hydroxy-2-methyl-1-phenylpropan-1-one, 1-(4-isopropylphenyl)-2-hydroxy-2-methylpropan-1-one, and 4-(2-hydroxyethoxy)phenyl-(2-hydroxy-2-propyl) ketone. Examples of the benzylketals include 1-hydroxycyclohexyl-phenyl ketone and benzyldimethylketal. Examples of the benzophenones include benzophenone and methyl o-benzoylbenzoate. Examples of the benzoins include benzoin, benzoin methyl ether, and benzoin isopropyl ether. The photopolymerization initiators can be used individually or in combination. The amount of the photopolymerization initiator used is preferably 1 to 15% by weight, more preferably 2 to 10% by weight, based on the weight of the composition (100% by weight).

(Thermoplastic Resin Substrate)

The thermoplastic resin substrate in the invention is a substrate containing a thermoplastic resin. Specific examples of thermoplastic resins include a polyethylene resin, a polypropylene resin, a polystyrene resin, a rubber modified polystyrene resin, an acrylonitrile-butadiene-styrene (ABS) resin, an acrylonitrile-styrene (AS) resin, a polymethyl methacrylate resin, an acrylic resin, a polyvinyl chloride resin, a polyvinylidene chloride resin, a polyethylene terephthalate resin, an ethylene vinyl alcohol resin, a cellulose acetate resin, an ionomer resin, a polyacrylonitrile resin, a polyamide resin, a polyacetal resin, a polybutylene terephthalate resin, a polylactate resin, a polyphenylene ether resin, a modified polyphenylene ether resin, a polycarbonate resin, a polysulfone resin, a polyphenylene sulfide resin, a polyether imide resin, a polyether sulfone resin, a polyarylate resin, a thermoplastic polyimide resin, a polyamide-imide resin, a polyether ether ketone resin, a polyketone resin, a liquid crystalline polyester resin, a fluororesin, a syndiotactic polystyrene resin, and a cyclic polyolefin resin. These thermoplastic resins can be used individually or in combination.

Preferred are an ABS resin, an acrylic resin, a polymethyl methacrylate resin, and a polycarbonate resin, and especially preferred is a polycarbonate resin.

The thermoplastic resin substrate may have an ingredient other than the thermoplastic resin, and may have incorporated thereinto a solvent, various resins, a reactive compound, a catalyst, a polymerization initiator, an organic filler, an inorganic filler, an organic solvent, an inorganic pigment, an organic pigment, a loading pigment, a clay mineral, a wax, a surfactant, a stabilizer, a fluidity controlling agent, a coupling agent, a dye, a leveling agent, a rheology controlling agent, an ultraviolet light absorber, an antioxidant, a plasticizer, or the like in such an amount that the effects of the invention are not sacrificed.

With respect to the form of the substrate, there is no particular limitation, and the substrate may be in a form of flat plate, sheet, or rod or may have a three-dimensional structure or a solid form. The substrate may have an arbitrary form according to the purpose, such as a form having a curvature in the entire surface or part thereof. Further, with respect to the hardness, thickness and the like of the substrate, there is no particular limitation. The method of the invention has a characteristic feature such that the laminated material after being produced is subjected to bending processing, and therefore a form of a flat plate or a sheet is especially preferred.

(Coated Material)

A coated material can be obtained by applying the composition in the invention to a thermoplastic resin substrate. With respect to the method for applying the composition, there is no particular limitation, and examples of application methods include a spraying method, a spin coating method, a dipping method, a flow coating method, a roll coating method, a blade coating method, a doctor roll method, a doctor blade method, a curtain coating method, a slit coating method, a screen printing method, and an ink-jet method. In the method, the viscosity of the composition may be controlled using a solvent or the like.

<Step 2>

The step 2 in the invention is a step of irradiating the coated material obtained in the step 1 with an active energy ray to cure the composition, obtaining a laminated material having a cured product layer obtained from the cured composition.

The curing with an active energy ray means curing a coated material by irradiating the coated material with an active energy ray. As examples of active energy rays, there can be mentioned an ultraviolet light, an electron beam, and ionizing radiations, such as an α-ray, a β-ray, and a γ-ray. Of these, especially preferred is an ultraviolet (UV) light from the viewpoint of the curing properties and easy availability.

Ultraviolet curing can be performed using, for example, a low-pressure mercury lamp, a high-pressure mercury lamp, a metal halide lamp, a xenon lamp, an argon laser, a helium-cadmium laser, or the like. By irradiating the applied surface of the coated material with an ultraviolet light having a wavelength of about 180 to 400 nm using the above lamp, the film can be cured to form a cured product layer, obtaining a laminated material. The dose of an ultraviolet light is appropriately selected according to the type and amount of the photopolymerization initiator used.

(Cured Product Layer)

The cured product layer in the laminated material in the invention preferably has a thickness of 0.5 to 40 μm. The reason for this is as follows. When the thickness of the cured product layer is 0.5 μm or more, a satisfactory abrasion resistance is exhibited, making it possible to protect the substrate. When the thickness is 40 μm or less, excellent flex resistance is exhibited. Further, the thickness of the cured product layer is preferably 0.5 to 30 μm, more preferably 0.5 to 15 μm, further preferably 1.0 to 7.0 μm, especially preferably 1.5 to 7.0 μm.

<Step 3>

The step 3 in the invention is a step of subjecting the laminated material obtained in the step 2 to bending processing to obtain a molded body.

In the invention, the laminated material having formed thereon a cured product layer having hard coat properties has such excellent processability that, even after the cured product layer is formed, the laminated material can be subjected to bending processing.

As examples of the bending processing, there can be mentioned bending processing for directly bending a laminated material, and processing methods, such as press molding, free blow forming, vacuum forming, air-pressure forming, and twin composite molding.

Further, the laminated material in the invention has a feature such that it has not only very excellent flexing properties especially upon being heated but also excellent hard coat properties after subjected to thermal bending processing.

The processing temperature in the thermal bending processing is preferably 80° C. or higher, especially preferably 150° C. or higher. The lower limit temperature of the processing temperature is less than the melting temperature of the thermoplastic resin substrate. The reason for this is that when the processing temperature is increased to the melting temperature of the thermoplastic resin substrate or higher, the substrate in the laminated material melts.

EXAMPLES

Hereinbelow, the present invention will be described in more detail with reference to the following Examples and Comparative Examples, and, in the followings, "part(s)" and are given by weight unless otherwise specified.

Synthesis Example: UA-1

350.63 Parts by mass of a mixture of pentaerythritol diacrylate, pentaerythritol triacrylate, and pentaerythritol tetraacrylate ("ARONIX M-306", manufactured by Toagosei Co., Ltd.; hydroxyl value: 165 mg KOH/g), 0.2 part by mass of dibutyltin dilaurate, and 0.2 part by mass of hydroquinone were charged into a four-neck flask and mixed together to prepare a uniform solution. The flask was heated until the inner temperature of the flask became 50° C., and then 111 parts by mass of isophorone diisocyanate was charged into the flask portion by portion over about one hour. The resultant mixture was subjected to reaction at 80°

[Chem. 17]

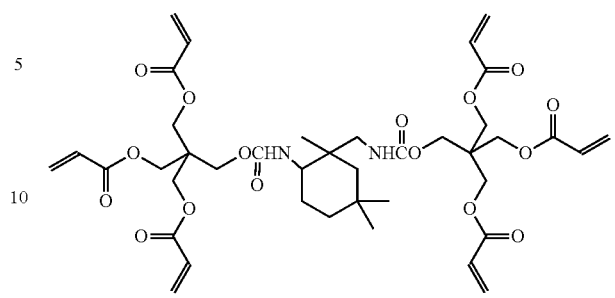

Synthesis Example: UA-2

350.63 Parts by mass of a mixture of pentaerythritol diacrylate, pentaerythritol triacrylate, and pentaerythritol tetraacrylate ("ARONIX M-306", manufactured by Toagosei Co., Ltd.; hydroxyl value: 165 mg KOH/g), 0.2 part by mass of dibutyltin dilaurate, and 0.2 part by mass of hydroquinone were charged into a four-neck flask and mixed together to prepare a uniform solution. The flask was heated until the inner temperature of the flask became 50° C., and then 103 parts by mass of norbornene diisocyanate was charged into the flask portion by portion over about one hour. The resultant mixture was subjected to reaction at 80° C. for 3 hours, and disappearance of the isocyanate group was checked from an infrared absorption spectrum, and then the nonvolatile content of the resultant reaction mixture was adjusted to 80% using butyl acetate to obtain urethane (meth)acrylate: UA-2. A polymerizable double bond equivalent calculated from the amounts of the charged raw materials was 128 g/mol.

[Chem. 18]

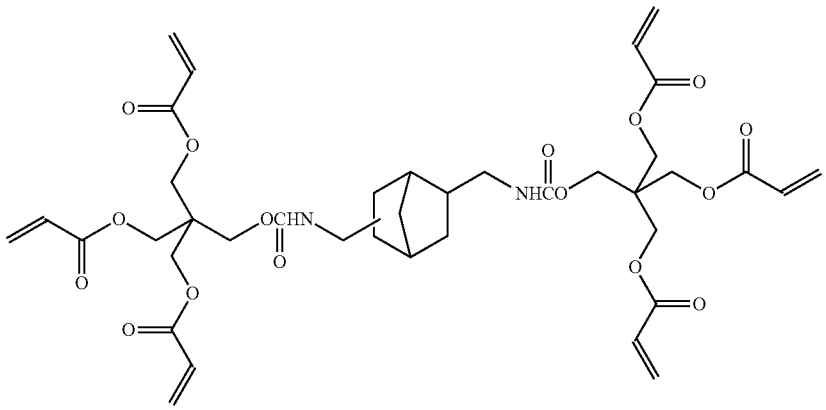

C. for 3 hours, and disappearance of the isocyanate group was checked from an infrared absorption spectrum, and then the nonvolatile content of the resultant reaction mixture was adjusted to 80% using butyl acetate to obtain urethane (meth)acrylate: UA-1. A polymerizable double bond equivalent calculated from the amounts of the charged raw materials was 131 g/mol.

Synthesis Example: UA-3

350.63 Parts by mass of a mixture of pentaerythritol diacrylate, pentaerythritol triacrylate, and pentaerythritol tetraacrylate ("ARONIX M-306", manufactured by Toagosei Co., Ltd.; hydroxyl value: 165 mg KOH/g), 0.2 part by mass of dibutyltin dilaurate, and 0.2 part by mass of hydroquinone were charged into a four-neck flask and mixed together to prepare a uniform solution. The flask was heated until the inner temperature of the flask became 50° C., and then 131 parts by mass of 4,4-methylenedicyclohexyl-diisocyanate was charged into the flask portion by portion over about one hour. The resultant mixture was subjected to reaction at 80° C. for 3 hours, and disappearance of the isocyanate group was checked from an infrared absorption spectrum, and then the nonvolatile content of the resultant reaction mixture was adjusted to 80% using butyl acetate to obtain urethane (meth)acrylate: UA-3. A polymerizable double bond calculated from the amounts of the charged raw materials was 136 g/mol.

[Chem. 19]

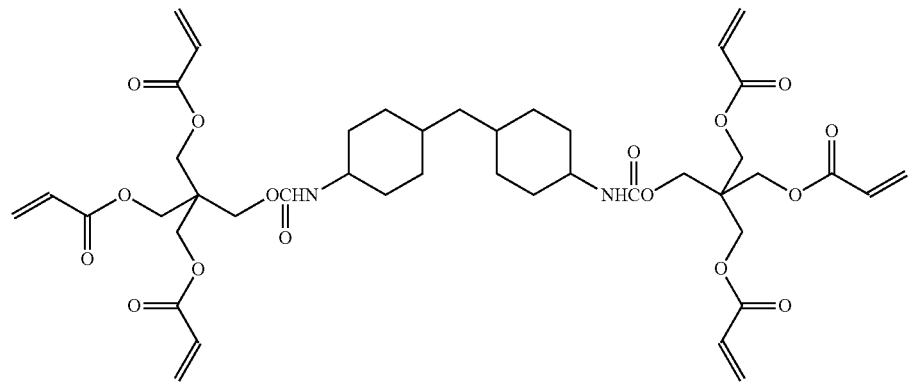

Synthesis Example: UA-4

350.63 Parts by mass of a mixture of pentaerythritol diacrylate, pentaerythritol triacrylate, and pentaerythritol tetraacrylate ("ARONIX M-306", manufactured by Toagosei Co., Ltd.; hydroxyl value: 165 mg KOH/g), 0.2 part by mass of dibutyltin dilaurate, and 0.2 part by mass of hydroquinone were charged into a four-neck flask and mixed together to prepare a uniform solution. The flask was heated until the inner temperature of the flask became 50° C., and then 97 parts by mass of hydrogenated xylene diisocyanate was charged into the flask portion by portion over about one hour. The resultant mixture was subjected to reaction at 80° C. for 3 hours, and disappearance of the isocyanate group was checked from an infrared absorption spectrum, and then the nonvolatile content of the resultant reaction mixture was adjusted to 80% using butyl acetate to obtain urethane (meth)acrylate: UA-4. A polymerizable double bond equivalent calculated from the amounts of the charged raw materials was 125 g/mol.

[Chem. 20]

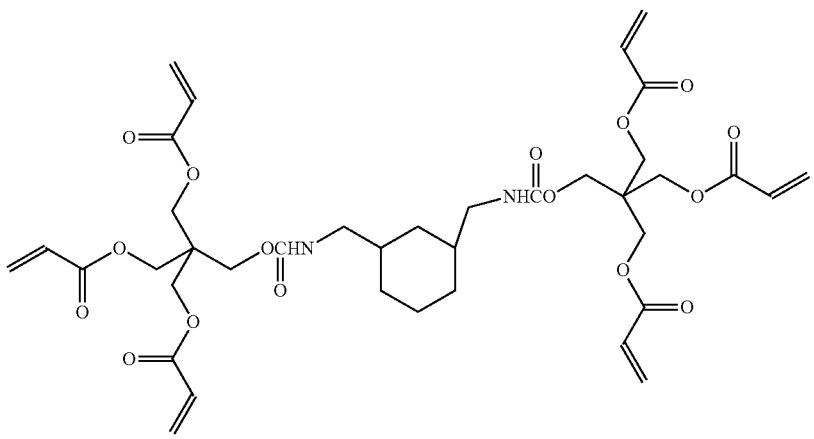

Synthesis Example: UA-5

Into a separable flask equipped with a thermometer and a stirrer were charged 200 g of methyl isobutyl ketone and 225.9 g of IPDI, and the inner temperature of the flask was increased to 50° C. while stirring. Then, 0.08 g of dibutyltin dilaurate was added and, while maintaining the inner temperature of the flask at 50° C., 99.8 g of tricyclodecanedimethanol was dropwise added over one hour. After completion of the addition, the resultant mixture was stirred at 50° C. for 2 hours, so that the reaction of the urethane isocyanate prepolymer was completed. The completion of the reaction was found by making sure that the isocyanate group concentration of the reaction mixture was the theoretical end point isocyanate group concentration or less. In the present Example, after making sure that the isocyanate group concentration of the reaction mixture was the theoretical end point isocyanate group concentration (8.12% by weight) or less, the next operation was conducted. Then, the inner temperature of the flask was increased to 70° C., and 0.08 g of dibutyltin laurate was added, and, while maintaining the reaction temperature at 70° C., 474.3 g of PETIA (product name "PETRA" (manufactured by Cytec Industries Inc.; a mixture of pentaerythritol triacrylate and pentaerythritol tetraacrylate having a hydroxyl value of 120 mg KOH/g)) was dropwise added over 2 hours. After completion of the addition, the resultant mixture was stirred at 70° C. for one hour. After making sure that the isocyanate group concentration was 0.1% by weight or less, the reaction was terminated to obtain urethane (meth)acrylate (UA-5) having in the skeleton an organic group derived from tricyclodecanedimethanol from which two hydrogen atoms of hydroxyl groups are removed, and having the functional group number of 6. A polymerizable double bond equivalent calculated from the amounts of the charged raw materials was 205 g/mol.

[Chem. 21]

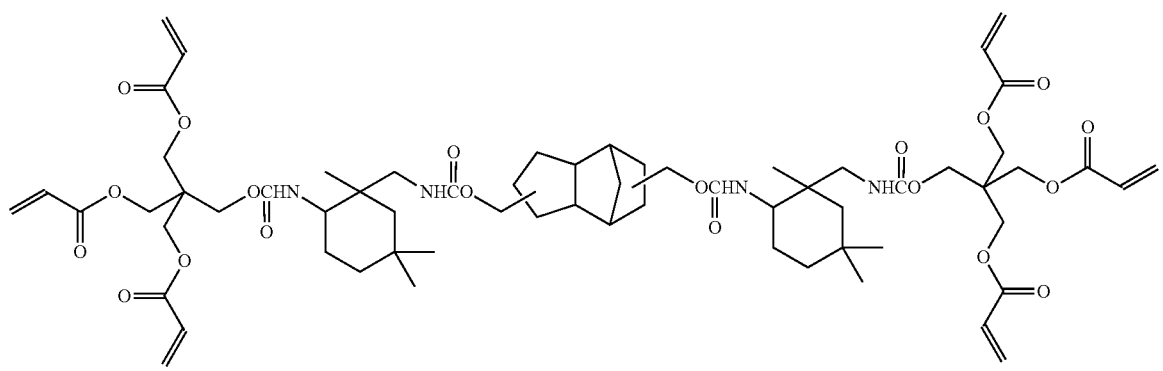

Synthesis Example UA-6

350.63 Parts by mass of a mixture of pentaerythritol diacrylate, pentaerythritol triacrylate, and pentaerythritol tetraacrylate ("ARONIX M-306", manufactured by Toagosei Co., Ltd.; hydroxyl value: 165 mg KOH/g), 0.2 part by mass of dibutyltin dilaurate, and 0.2 part by mass of hydroquinone were charged into a four-neck flask and mixed together to prepare a uniform solution. The flask was heated until the inner temperature of the flask became 50° C., and then 168 parts by mass of HDI-dimerized isocyanate was charged into the flask portion by portion over about one hour. The resultant mixture was subjected to reaction at 80° C. for 3 hours, and disappearance of the isocyanate group was checked from an infrared absorption spectrum, and then the nonvolatile content of the resultant reaction mixture was adjusted to 80% using butyl acetate to obtain urethane (meth)acrylate: UA-6. A polymerizable double bond equivalent calculated from the amounts of the charged raw materials was 148 g/mol.

[Chem. 22]

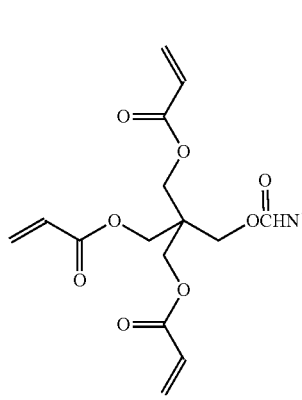

Synthesis Example: UA-7

525.95 Parts by mass of a mixture of pentaerythritol diacrylate, pentaerythritol triacrylate, and pentaerythritol tetraacrylate ("ARONIX M-306", manufactured by Toagosei Co., Ltd.; hydroxyl value: 165 mg KOH/g), 0.3 part by mass of dibutyltin dilaurate, and 0.3 part by mass of hydroquinone were charged into a four-neck flask and mixed together to prepare a uniform solution. The flask was heated until the inner temperature of the flask became 50° C., and then 252 parts by mass of HDI-trimerized isocyanate was charged into the flask portion by portion over about one hour. The resultant mixture was subjected to reaction at 80° C. for 3 hours, and disappearance of the isocyanate group was checked from an infrared absorption spectrum, and then the nonvolatile content of the resultant reaction mixture was adjusted to 80% using butyl acetate to obtain urethane (meth)acrylate: UA-7. A polymerizable double bond equivalent calculated from the amounts of the charged raw materials was 186 g/mol.

[Chem. 23]

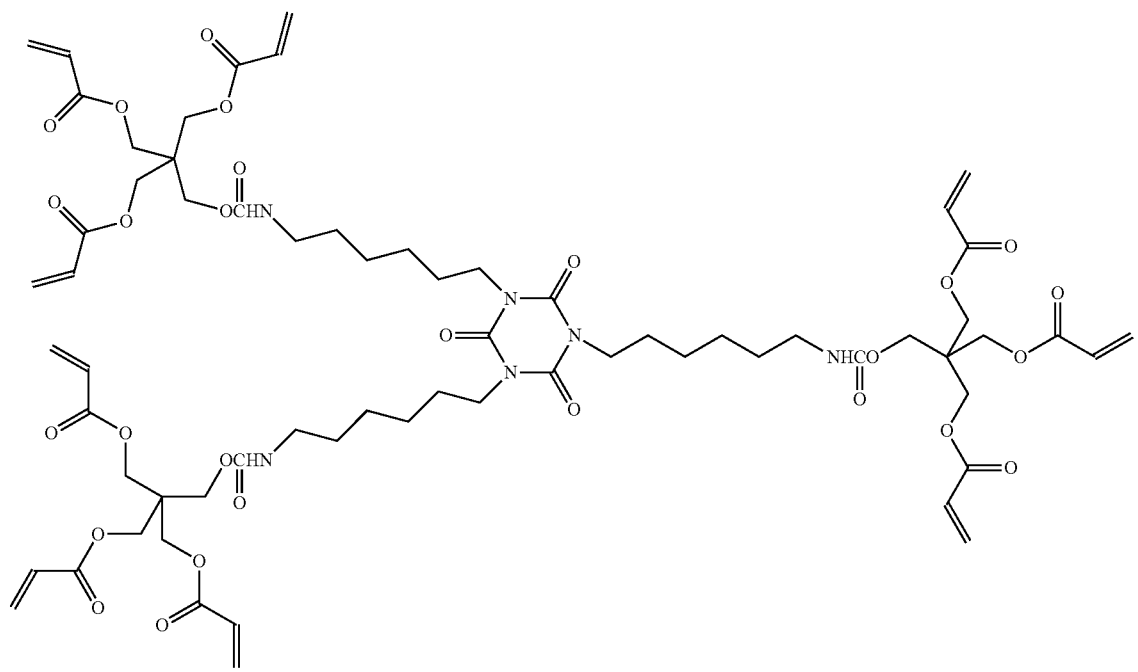

Synthesis Example: UA-8

Into a reaction vessel equipped with a stirrer, a thermometer, a dropping funnel, a condenser, and an air introducing inlet were charged 111 parts by mass of isophorone diisocyanate, 1.55 parts by mass of dibutylhydroxytoluene, 0.15 part by mass of methoquinone, and 0.15 part by mass of dioctyltin dineodecanoate, and the temperature of the resultant mixture was increased to 60° C. under an air stream while stirring. Then, 836.77 parts by mass of polycaprolactone-modified monoacrylate ("Placcel FA10L", manufactured by Daicel Corporation) was dropwise added to the mixture over one hour. After completion of the addition, the temperature in the reaction vessel was increased to 80° C., and the mixture was stirred for 5 hours to conduct an urethane forming reaction, obtaining an alicyclic structure-containing lactone-modified urethane acrylate (polymerizable double bond equivalent: 1,369 g/mol)

[Chem. 24]

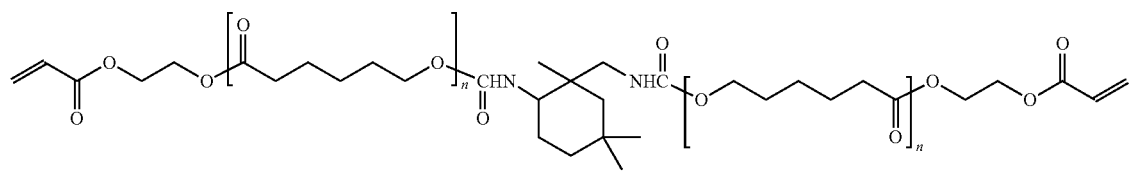

Synthesis Example: UA-9

350.63 Parts by mass of a mixture of pentaerythritol diacrylate, pentaerythritol triacrylate, and pentaerythritol tetraacrylate ("ARONIX M-306", manufactured by Toagosei Co., Ltd.; hydroxyl value: 165 mg KOH/g), 0.2 part by mass of dibutyltin dilaurate, and 0.2 part by mass of hydroquinone were charged into a four-neck flask and mixed together to prepare a uniform solution. The flask was heated until the inner temperature of the flask became 50° C., and then 84 parts by mass of hexamethylene diisocyanate was charged into the flask portion by portion over about one hour. The resultant mixture was subjected to reaction at 80° C. for 3 hours, and disappearance of the isocyanate group was checked from an infrared absorption spectrum, and then the nonvolatile content of the resultant reaction mixture was adjusted to 80% using butyl acetate to obtain an urethane (meth)acrylate resin UA-9. A polymerizable double bond equivalent calculated from the amounts of the charged raw materials was 122 g/mol.

[Chem. 25]

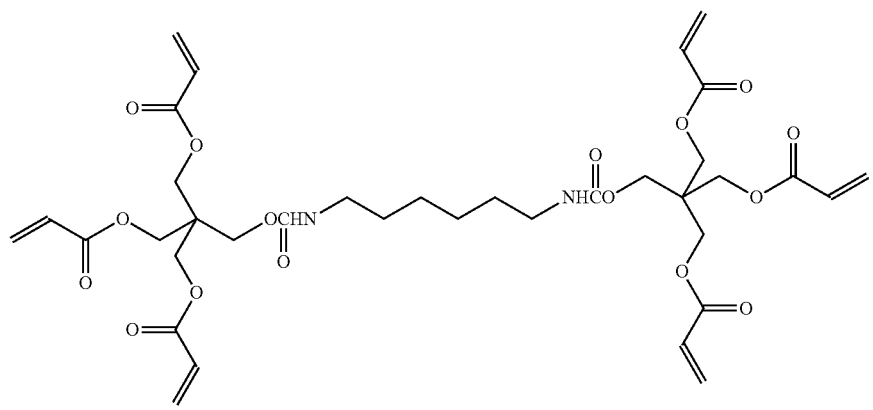

Synthesis Example: UA-10

525.95 Parts by mass of a mixture of pentaerythritol diacrylate, pentaerythritol triacrylate, and pentaerythritol tetraacrylate ("ARONIX M-306", manufactured by Toagosei Co., Ltd.; hydroxyl value: 165 mg KOH/g), 0.2 part by mass of dibutyltin dilaurate, and 0.2 part by mass of hydroquinone were charged into a four-neck flask and mixed together to prepare a uniform solution. The flask was heated until the inner temperature of the flask became 50° C., and then 252 parts by mass of HDI-biuret type isocyanate was charged into the flask portion by portion over about one hour. The resultant mixture was subjected to reaction at 80°

C. for 3 hours, and disappearance of the isocyanate group was checked from an infrared absorption spectrum, and then the nonvolatile content of the resultant reaction mixture was adjusted to 80% using butyl acetate to obtain urethane (meth)acrylate: UA-10. A polymerizable double bond equivalent calculated from the amounts of the charged raw materials was 186 g/mol.

[Chem. 26]

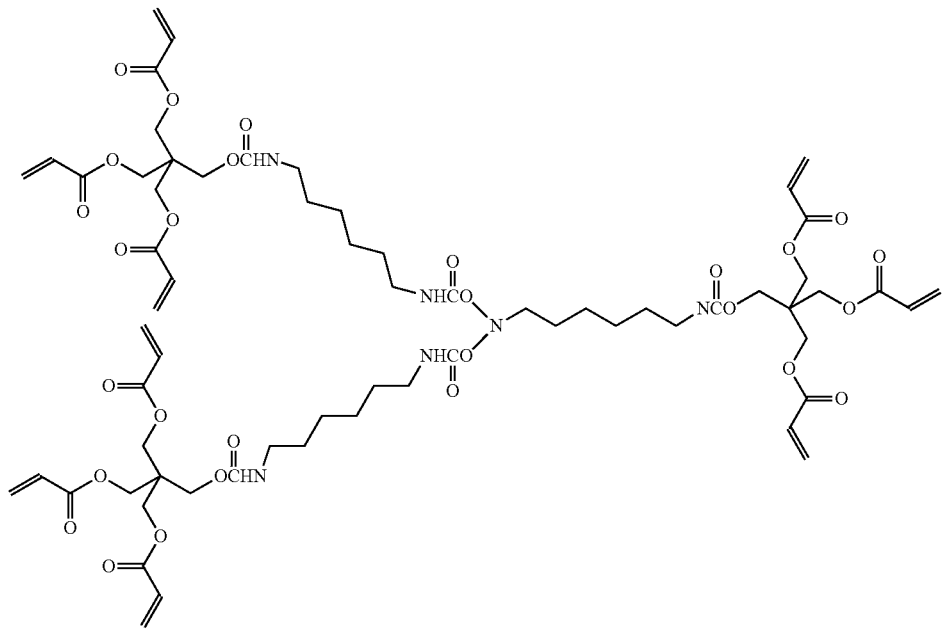

Example 1

(Preparation of Composition 1)

Into 100 parts by weight of the synthesized UA-5 were incorporated 1 part by weight of Tinuvin 123 (manufactured by BASF AG, light stabilizer), 3 parts by weight of Tinuvin 479 (manufactured by BASF AG, ultraviolet light absorber), 3 parts by weight of Irgcure 907 (manufactured by BASF AG, photoinitiator), and 0.1 part by weight of BYK-UV-3505 (BYK-Chemie), and the resultant mixture was stirred, and then diluted with propylene glycol monomethyl ether to obtain a composition 1 having a resin solids amount of 50 parts by weight.

(Application)

The composition 1 was applied to a polycarbonate plate (Carboglass Polish Clear, manufactured by Asahi Glass Co., Ltd.; thickness: 2 mm) using a bar coater so that the dried film had a thickness of about 5 μm, and dried using a dryer at 80° C. for 4 to 6 minutes.

(Curing)

In ultraviolet light irradiation, a high-pressure mercury lamp, manufactured by GS-YUASA International Ltd., was used, and the lamp output, lamp height, and conveyer speed were controlled so that, in the UV-A region of UV POWER PUCK, manufactured by EIT LLC, the peak illuminance became 200 mW/cm$^2$ and the irradiation energy per one pass became 1,000 mJ/cm$^2$, and irradiation was conducted with one pass (total: 1,000 mJ/cm$^2$) to obtain a laminated material 1.

[Bending Processing Test: Flex Resistance]

The laminated material was heated by a thermostat at a predetermined temperature for 10 minutes, and then the hard coat laminated material was wound round the outer periphery of a cylinder having a certain diameter so that the hard coat layer of the laminated material was positioned outside.

The flexing properties were evaluated from the diameter of the cylinder (0.6 to 9 cm) with which a crack was caused in the hard coat layer.

[HC Test after Bending: Abrasion Resistance]

With respect to the surface of the laminated material which has been subjected to the bending processing test (cylinder diameter: 30 cm), the surface in a curved state is abraded by a Taber abrasion test in accordance with the method of ASTM D1044 (truck wheel: CS-10F; load: 500 g; number of revolutions: 500), and a difference in haze between the resultant surface and the surface in the initial state, i.e., a haze value change ΔH (%) is measured. The smaller the difference, the higher the abrasion resistance.

[HC Test after Bending: Marring Resistance Test]

With respect to the surface in a curved state of the laminated material which had been subjected to the bending processing test (cylinder diameter: 30 cm), a marring test was conducted in which an indenter in a square form having one side of 2 centimeters was wrapped in steel wool ("Bonstar #0000", manufactured by Nihon Steel Wool Co., Ltd.), and the indenter having applied thereto a load of 1 kg weight was reciprocally moved 11 times on the surface of the cured film of the curable composition. The marring resistance was evaluated from the number of marring marks caused in the film after the marring test.

⊙: 10 or less

◯: 20 or less x: 20 or more

Examples 2 to 27 and Comparative Examples 1 to 4

The production and evaluation of a laminated material were conducted in substantially the same manner as in Example 1 except that the conditions were changed to those described in Tables 1-1 to 1-4.

TABLE 1-1

| Construction | | Name | Polymerizable double bond equivalent | Example 1 Composition 1 | Example 2 Composition 2 | Example 3 Composition 3 | Example 4 Composition 4 |
|---|---|---|---|---|---|---|---|
| Alicyclic (meth)acrylate | Urethane (meth)acrylate | UA-1 | 131 | | | | |
| | | UA-2 | 128 | | | | |
| | | UA-3 | 136 | | | | |
| | | UA-4 | 125 | | | | |
| | | UA-5 | 205 | 100 | 100 | 90 | 90 |
| | | UA-6 | 148 | | | | |
| | | UA-8 | 1369 | | | | |
| | Ester (meth)acrylate | A-DCP | 152 | | | 10 | |
| Isocyanurate-containing (meth)acrylate | Urethane (meth)acrylate | UA-7 | 186 | | | | |
| | Ester (meth)acrylate | M-315 | 141 | | | | |
| Other (meth)acrylates | Urethane (meth)acrylate | UA-9 | 122 | | | | |
| | | UA-10 | 186 | | | | |
| | Ester (meth)acrylate | DPCA-30 | 153 | | | | 10 |
| Silica | Surface unmodified silica | | Silica-1 | | | | |
| | Surface modified silica | | Silica-2 | | | | |
| | | | Silica-3 | | | | |
| Other ingredients | | Tinuvin123 | | 1 | 1 | 1 | 1 |
| | | Tinuvin479 | | 3 | 3 | 3 | 3 |
| | | Irgacure907 | | 3 | 3 | 3 | 3 |
| | | BYK-UV-3505 | | 0.1 | 0.1 | 0.1 | 0.1 |
| Processing conditions | | Thickness | μm | 5 | 20 | 5 | 5 |
| | | Bending processing temperature | °C. | 175 | 175 | 175 | 175 |
| Abrasion resistance (500 g, 500 times) | | | ΔHaze | 4.6 | 4.4 | 6.8 | 4.6 |
| Marring resistance #0000, 1 kg, 11 times | | | Visual evaluation | ⊙ | ⊙ | ○ | ○ |
| Thermal bending processing properties (cm) | | | Crack curvature | 3.2 | 6 | 2.4 | 2.4 |

| Construction | | Name | Polymerizable double bond equivalent | Example 5 Composition 5 | Example 6 Composition 6 | Example 7 Composition 7 | Example 8 Composition 8 |
|---|---|---|---|---|---|---|---|
| Alicyclic (meth)acrylate | Urethane (meth)acrylate | UA-1 | 131 | | | 90 | |
| | | UA-2 | 128 | | | | 90 |
| | | UA-3 | 136 | | | | |
| | | UA-4 | 125 | | | | |
| | | UA-5 | 205 | 90 | 70 | | |
| | | UA-6 | 148 | | | | |
| | | UA-8 | 1369 | | | | |
| | Ester (meth)acrylate | A-DCP | 152 | | | | |
| Isocyanurate-containing (meth)acrylate | Urethane (meth)acrylate | UA-7 | 186 | | | | |
| | Ester (meth)acrylate | M-315 | 141 | 10 | 30 | 10 | 10 |
| Other (meth)acrylates | Urethane (meth)acrylate | UA-9 | 122 | | | | |
| | | UA-10 | 186 | | | | |
| | Ester (meth)acrylate | DPCA-30 | 153 | | | | |
| Silica | Surface unmodified silica | | Silica-1 | | | | |
| | Surface modified silica | | Silica-2 | | | | |
| | | | Silica-3 | | | | |
| Other ingredients | | Tinuvin123 | | 1 | 1 | 1 | 1 |
| | | Tinuvin479 | | 3 | 3 | 3 | 3 |
| | | Irgacure907 | | 3 | 3 | 3 | 3 |
| | | BYK-UV-3505 | | 0.1 | 0.1 | 0.1 | 0.1 |

TABLE 1-1-continued

| | | | | | | |
|---|---|---|---|---|---|---|
| Processing conditions | Thickness | μm | 5 | 5 | 5 | 5 |
| | Bending processing temperature | ° C. | 175 | 175 | 175 | 175 |
| Abrasion resistance (500 g, 500 times) | | ΔHaze | 3.5 | 4.1 | 6.2 | 3.9 |
| Marring resistance #0000, 1 kg, 11 times | | Visual evaluation | ⊙ | ⊙ | ⊙ | ⊙ |
| Thermal bending processing properties (cm) | | Crack curvature | 1.4 | 1.6 | 1.4 | 1.9 |

TABLE 1-2

| Construction | | Name | Polymerizable double bond equivalent | Example 9 Composition 9 | Example 10 Composition 10 | Example 11 Composition 11 | Example 12 Composition 12 |
|---|---|---|---|---|---|---|---|
| Alicyclic (meth)acrylate | Urethane (meth)acrylate | UA-1 | 131 | | | | |
| | | UA-2 | 128 | | | | |
| | | UA-3 | 136 | 90 | | | |
| | | UA-4 | 125 | | 90 | | |
| | | UA-5 | 205 | | | | 85 |
| | | UA-6 | 148 | | | 90 | |
| | | UA-8 | 1369 | | | | |
| | Ester (meth)acrylate | A-DCP | 152 | | | | |
| Isocyanurate - containing (meth)acrylate | Urethane (meth)acrylate | UA-7 | 186 | | | | 5 |
| | Ester (meth)acrylate | M-315 | 141 | 10 | 10 | 10 | 10 |
| Other (meth)acrylates | Urethane (meth)acrylate | UA-9 | 122 | | | | |
| | | UA-10 | 186 | | | | |
| | Ester (meth)acrylate | DPCA-30 | 153 | | | | |
| Silica | Surface unmodified silica | | Silica-1 | | | | |
| | Surface modified silica | | Silica-2 | | | | |
| | | | Silica-3 | | | | |
| Other ingredients | | Tinuvin123 | | 1 | 1 | 1 | 1 |
| | | Tinuvin479 | | 3 | 3 | 3 | 3 |
| | | Irgacure907 | | 3 | 3 | 3 | 3 |
| | | BYK-UV-3505 | | 0.1 | 0.1 | 0.1 | 0.1 |
| Processing conditions | Thickness | | μm | 5 | 5 | 5 | 5 |
| | Bending processing temperature | | ° C. | 175 | 175 | 175 | 175 |
| Abrasion resistance (500 g, 500 times) | | ΔHaze | | 3.2 | 4.9 | 4.5 | 3.6 |
| Marring resistance #0000, 1 kg, 11 times | | Visual evaluation | | ⊙ | ⊙ | ◯ | ⊙ |
| Thermal bending processing properties (cm) | | Crack curvature | | 1.4 | 1.9 | 1.9 | 0.9 |

| Construction | | Name | Polymerizable double bond equivalent | Example 13 Composition 13 | Example 14 Composition 14 | Example 15 Composition 15 | Example 16 Composition 16 |
|---|---|---|---|---|---|---|---|
| Alicyclic (meth)acrylate | Urethane (meth)acrylate | UA-1 | 131 | | | | |
| | | UA-2 | 128 | | | | |
| | | UA-3 | 136 | | | | |
| | | UA-4 | 125 | | | | |
| | | UA-5 | 205 | 80 | 45 | 10 | 5 |
| | | UA-6 | 148 | | | | |
| | | UA-8 | 1369 | | | | |
| | Ester (meth)acrylate | A-DCP | 152 | | | | |
| Isocyanurate - containing (meth)acrylate | Urethane (meth)acrylate | UA-7 | 186 | 10 | 45 | 80 | 85 |
| | Ester (meth)acrylate | M-315 | 141 | 10 | 10 | 10 | 10 |
| Other (meth)acrylates | Urethane (meth)acrylate | UA-9 | 122 | | | | |
| | | UA-10 | 186 | | | | |
| | Ester (meth)acrylate | DPCA-30 | 153 | | | | |
| Silica | Surface unmodified silica | | Silica-1 | | | | |
| | Surface modified silica | | Silica-2 | | | | |
| | | | Silica-3 | | | | |

TABLE 1-2-continued

| | | | | | | |
|---|---|---|---|---|---|---|
| Other ingredients | | Tinuvin123 | 1 | 1 | 1 | 1 |
| | | Tinuvin479 | 3 | 3 | 3 | 3 |
| | | Irgacure907 | 3 | 3 | 3 | 3 |
| | | BYK-UV-3505 | 0.1 | 0.1 | 0.1 | 0.1 |
| Processing conditions | Thickness | μm | 5 | 5 | 5 | 5 |
| | Bending processing temperature | ° C. | 175 | 175 | 175 | 175 |
| | Abrasion resistance (500 g, 500 times) | ΔHaze | 3.4 | 3.8 | 3.8 | 3.8 |
| | Marring resistance #0000, 1 kg, 11 times | Visual evaluation | ⊙ | ⊙ | ⊙ | ⊙ |
| | Thermal bending processing properties (cm) | Crack curvature | 0.6 | 0.9 | 1.2 | 1.2 |

TABLE 1-3

| Construction | | Name | Polymerizable double bond equivalent | Example 17 Composition 17 | Example 18 Composition 18 | Example 19 Composition 19 | Example 20 Composition 20 |
|---|---|---|---|---|---|---|---|
| Alicyclic (meth)acrylate | Urethane (meth)acrylate | UA-1 | 131 | | | | |
| | | UA-2 | 128 | | | | |
| | | UA-3 | 136 | | | | |
| | | UA-4 | 125 | | | | |
| | | UA-5 | 205 | 45 | 45 | 45 | 45 |
| | | UA-6 | 148 | | | | |
| | | UA-8 | 1369 | | | | |
| | Ester (meth)acrylate | A-DCP | 152 | | | | |
| Isocyanurate-containing (meth)acrylate | Urethane (meth)acrylate | UA-7 | 186 | 45 | 45 | 45 | 45 |
| | Ester (meth)acrylate | M-315 | 141 | 10 | 10 | 10 | 10 |
| Other (meth)acrylates | Urethane (meth)acrylate | UA-9 | 122 | | | | |
| | | UA-10 | 186 | | | | |
| | Ester (meth)acrylate | DPCA-30 | 153 | | | | |
| Silica | Surface unmodified silica | Silica-1 | | 10 | | | |
| | Surface modified silica | Silica-2 | | | 10 | | 10 |
| | | Silica-3 | | | | 10 | |
| Other ingredients | | Tinuvin123 | | 1.1 | 1.1 | 1.1 | 1.1 |
| | | Tinuvin479 | | 3.3 | 3.3 | 3.3 | 3.3 |
| | | Irgacure907 | | 3.3 | 3.3 | 3.3 | 3.3 |
| | | BYK-UV-3505 | | 0.11 | 0.11 | 0.11 | 0.11 |
| Processing conditions | Thickness | μm | | 5 | 5 | 5 | 1 |
| | Bending processing temperature | ° C. | | 175 | 175 | 175 | 175 |
| | Abrasion resistance (500 g, 500 times) | ΔHaze | | 2.8 | 2.5 | 3 | 4.9 |
| | Marring resistance #0000, 1 kg, 11 times | Visual evaluation | | ⊙ | ⊙ | ○ | ⊙ |
| | Thermal bending processing properties (cm) | Crack curvature | | 1.9 | 1.2 | 1.2 | 0.6 |

| Construction | | Name | Polymerizable double bond equivalent | Example 21 Composition 21 | Example 22 Composition 22 | Example 23 Composition 23 | Example 24 Composition 24 |
|---|---|---|---|---|---|---|---|
| Alicyclic (meth)acrylate | Urethane (meth)acrylate | UA-1 | 131 | | | | |
| | | UA-2 | 128 | | | | |
| | | UA-3 | 136 | | | | |
| | | UA-4 | 125 | | | | |
| | | UA-5 | 205 | 45 | 45 | 45 | 45 |
| | | UA-6 | 148 | | | | |
| | | UA-8 | 1369 | | | | |
| | Ester (meth)acrylate | A-DCP | 152 | | | | |
| Isocyanurate-containing (meth)acrylate | Urethane (meth)acrylate | UA-7 | 186 | 45 | 45 | 45 | 45 |
| | Ester (meth)acrylate | M-315 | 141 | 10 | 10 | 10 | 10 |

TABLE 1-3-continued

| Construction | | Name | | Example 21 | Example 22 | Example 23 | Example 24 |
|---|---|---|---|---|---|---|---|
| Other (meth)acrylates | Urethane (meth)acrylate | UA-9 | 122 | | | | |
| | | UA-10 | 186 | | | | |
| | Ester (meth)acrylate | DPCA-30 | 153 | | | | |
| Silica | Surface unmodified silica | Silica-1 | | | | | |
| | Surface modified silica | Silica-2 | | 10 | 10 | 10 | 10 |
| | | Silica-3 | | | | | |
| Other ingredients | | Tinuvin123 | | 1.1 | 1.1 | 1.1 | 1.1 |
| | | Tinuvin479 | | 3.3 | 3.3 | 3.3 | 3.3 |
| | | Irgacure907 | | 3.3 | 3.3 | 3.3 | 3.3 |
| | | BYK-UV-3505 | | 0.11 | 0.11 | 0.11 | 0.11 |
| Processing conditions | Thickness | | μm | 2 | 2.5 | 10 | 20 |
| | Bending processing temperature | | °C. | 175 | 175 | 175 | 175 |
| | Abrasion resistance (500 g, 500 times) | ΔHaze | | 3.2 | 2.4 | 2.4 | 2.4 |
| | Marring resistance #0000, 1 kg, 11 times | Visual evaluation | | ☉ | ☉ | ☉ | ☉ |
| | Thermal bending processing properties (cm) | Crack curvature | | 0.9 | 0.9 | 1.6 | 2.4 |

TABLE 1-4

| Construction | | Name | Polymerizable double bond equivalent | Example 25 Composition 25 | Example 26 Composition 26 | Example 27 Composition 27 | Comparative Example 1 Comparative Composition 1 |
|---|---|---|---|---|---|---|---|
| Alicyclic (meth)acrylate | Urethane (meth)acrylate | UA-1 | 131 | | | | |
| | | UA-2 | 128 | | | | |
| | | UA-3 | 136 | 90 | 90 | 90 | |
| | | UA-4 | 125 | | | | |
| | | UA-5 | 205 | | | | |
| | | UA-6 | 148 | | | | |
| | | UA-8 | 1369 | | | | |
| | Ester (meth)acrylate | A-DCP | 152 | | | | |
| Isocyanurate-containing (meth)acrylate | Urethane (meth)acrylate | UA-7 | 186 | | | | |
| | Ester (meth)acrylate | M-315 | 141 | 10 | 10 | 10 | |
| Other (meth)acrylates | Urethane (meth)acrylate | UA-9 | 122 | | | | 100 |
| | | UA-10 | 186 | | | | |
| | Ester (meth)acrylate | DPCA-30 | 153 | | | | |
| Silica | Surface unmodified silica | Silica-1 | | | | | |
| | Surface modified silica | Silica-2 | | | | | |
| | | Silica-3 | | | | | |
| Other ingredients | | Tinuvin123 | | 1 | 1 | 1 | 1 |
| | | Tinuvin479 | | 3 | 3 | 3 | 3 |
| | | Irgacure907 | | 3 | 3 | 3 | 3 |
| | | BYK-UV-3505 | | 0.1 | 0.1 | 0.1 | 0.1 |
| Processing conditions | Thickness | | μm | 5 | 5 | 5 | 20 |
| | Bending processing temperature | | °C. | 25 | 80 | 150 | 175 |
| | Abrasion resistance (500 g, 500 times) | ΔHaze | | 3.2 | 3.2 | 3.2 | 4.1 |
| | Marring resistance #0000, 1 kg, 11 time | Visual evaluation | | ☉ | ☉ | ☉ | ☉ |
| | Thermal bending processing properties (cm) | Crack curvature | | 2.9 | 2.4 | 1.6 | 9 |

| Construction | | Name | Polymerizable double bond equivalent | Comparative Example 2 Comparative Composition 2 | Comparative Example 3 Comparative Composition 4 | Comparative Example 4 Comparative Composition 5 |
|---|---|---|---|---|---|---|
| Alicyclic (meth)acrylate | Urethane (meth)acrylate | UA-1 | 131 | | | |
| | | UA-2 | 128 | | | |
| | | UA-3 | 136 | | | |
| | | UA-4 | 125 | | | |

TABLE 1-4-continued

| | | | | | | |
|---|---|---|---|---|---|---|
| | | UA-5 | 205 | | | |
| | | UA-6 | 148 | | | |
| | | UA-8 | 1369 | | 100 | |
| | Ester (meth)acrylate | A-DCP | 152 | | | 100 |
| Isocyanurate-containing (meth)acrylate | Urethane (meth)acrylate | UA-7 | 186 | 100 | | |
| | Ester (meth)acrylate | M-315 | 141 | | | |
| Other (meth)acrylates | Urethane (meth)acrylate | UA-9 | 122 | | | |
| | | UA-10 | 186 | | | |
| | Ester (meth)acrylate | DPCA-30 | 153 | | | |
| Silica | Surface unmodified silica | Silica-1 | | | | |
| | Surface modified silica | Silica-2 | | | 10 | |
| | | Silica-3 | | | | |
| Other ingredients | | Tinuvin123 | | 1 | 1.1 | 1 |
| | | Tinuvin479 | | 3 | 3.3 | 3 |
| | | Irgacure907 | | 3 | 3.3 | 3 |
| | | BYK-UV-3505 | | 0.1 | 0.11 | 0.1 |
| Processing conditions | | Thickness | μm | 20 | 20 | 20 |
| | | Bending processing temperature | °C. | 175 | 175 | 175 |
| | Abrasion resistance (500 g, 500 times) | | ΔHaze | 4.8 | 25.6 | 19.1 |
| | Marring resistance #0000, 1 kg, 11 times | | Visual evaluation | ☉ | X | Δ |
| | Thermal bending processing properties (cm) | | Crack curvature | 7.5 | <0.9 | 7.5 |

A-DCP: Cyclodecanedimethanol diacrylate (manufactured by Shin-Nakamura Chemical Co., Ltd.)

DPCA-30: DPHA Lactone-modified compound (manufactured by Nippon Kayaku Co., Ltd.)

Silica-1: PGM-ST (manufactured by Nissan Chemical Industries, Ltd.) Unmodified silica (average particle diameter: 50 nm)

Silica-2: MIBK-SD (manufactured by Nissan Chemical Industries, Ltd.) Methacryloyl-modified silica (average particle diameter: 50 nm)

Silica-3: R7200 (manufactured by Nippon Aerosil Co., Ltd.) Methacryloyl-modified silica (average particle diameter: 150 nm)

INDUSTRIAL APPLICABILITY

By the present invention, there can be produced a hard coat laminated material which has a two-layer structure including a substrate and which is two-dimensionally bending processable. Consequently, in outdoor applications, such as a carport, a sound barrier for expressway, and resin glass, a component comprising, for example, a transparent resin plate and having a flat portion and a continuous curved portion can be provided at a low cost.

The invention claimed is:

1. A method for producing a molded body, comprising:
   a step 1 of applying a composition containing an isocyanurate skeleton-containing (meth)acrylate to a thermoplastic resin substrate to obtain a coated material,
   a step 2 of irradiating the obtained coated material with an active energy ray to cure the composition so that a laminated material is obtained which has a cured product layer obtained by curing the composition, and
   a step 3 of subjecting the obtained laminated material to bending processing to obtain a molded body, wherein
   the isocyanurate skeleton-containing (meth)acrylate having an isocyanurate ring and an urethane linkage and having a polymerizable double bond equivalent of 100 to 1,000 g/mol,
   wherein the composition further comprises an alicyclic urethane (meth)acrylate having a structure having an alicyclic structure represented by formula (A):

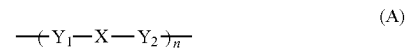

wherein X is at least one of alicyclic structures represented by formula (1);

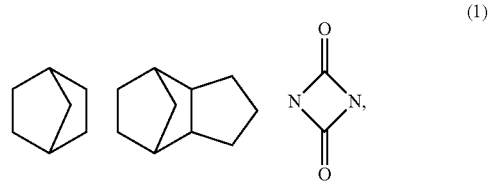

wherein formula (a) optionally has a substituent, wherein each of $Y_1$ and $Y_2$ is independently a direct bond, a hydrocarbon group having 1 to 10 carbon atoms, an urethane linkage, an ether linkage, an amide linkage, or a carbonyl group, and n represents an integer of 1 to 6, the alicyclic urethane (meth)acrylate has a group having two or more (meth)acryloyl groups represented by formula (B):

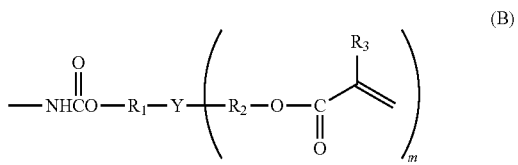

wherein $R_1$ is a direct bond or a divalent linking group, Y is a direct bond or a carbon atom, $R_2$ is a direct bond, a hydrocarbon group having 1 to 3 carbon atoms, or a carbonyl group, $R_3$ is a hydrogen atom or a methyl group, and m represents an integer of 1 to 3, and the alicyclic urethane (meth)acrylate has a polymerizable double bond equivalent of 100 to 1,000 g/mol.

2. The method for producing a molded body according to claim 1, wherein, in the step 3 of subjecting the obtained laminated material to bending processing to obtain a molded body, a processing temperature is 80° C. to less than the melting temperature of the thermoplastic resin substrate.

3. A method for producing a molded body, comprising:

a step 1 of applying a composition containing an isocyanurate skeleton-containing (meth)acrylate to a thermoplastic resin substrate to obtain a coated material, a step 2 of irradiating the obtained coated material with an active energy ray to cure the composition so that a laminated material is obtained which has a cured product layer obtained by curing the composition, and a step 3 of subjecting the obtained laminated material to bending processing to obtain a molded body, wherein the isocyanurate skeleton-containing (meth)acrylate having an isocyanurate ring and an urethane linkage and having a polymerizable double bond equivalent of 100 to 1,000 g/mol, wherein the composition further comprises an alicyclic urethane (meth)acrylate having a structure having an alicyclic structure represented by formula (A):

wherein X is at least one of alicyclic structures represented by formula (1):

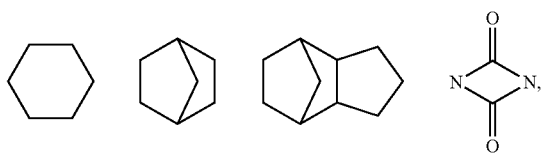

wherein formula (a) optionally has a substituent, wherein each of $Y_1$ and $Y_2$ is independently a direct bond, a hydrocarbon group having 1 to 10 carbon atoms, an urethane linkage, an ether linkage, an amide linkage, or a carbonyl group, and n represents an integer of 1 to 6, the alicyclic urethane (meth)acrylate has a group having two or more (meth)acryloyl groups represented by formula (B):

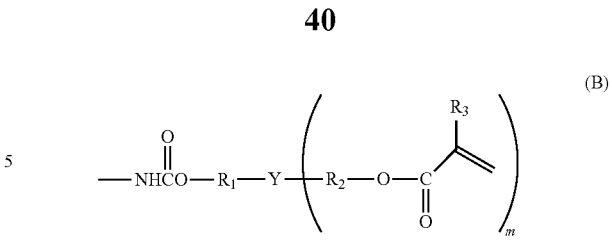

wherein $R_1$ is a direct bond or a divalent linking group, Y is a direct bond or a carbon atom, $R_2$ is a direct bond, a hydrocarbon group having 1 to 3 carbon atoms, or a carbonyl group, $R_3$ is a hydrogen atom or a methyl group, and m represents an integer of 2 to 3, and the alicyclic urethane (meth)acrylate has a polymerizable double bond equivalent of 100 to 1,000 g/mol.

4. The method for producing a molded body according to claim 3, wherein the alicyclic urethane (meth)acrylate is a compound represented by following formula (2):

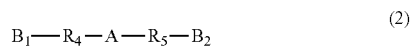

wherein A is a structure represented by the formula (A) above, each of $B_1$ and $B_2$ is independently a structure represented by the formula (B) above, and each of $R_4$ and $R_5$ independently represents a direct bond or a hydrocarbon group having 1 to 10 carbon atoms.

5. The method for producing a molded body according to claim 1, wherein the isocyanurate skeleton-containing (meth)acrylate comprises an isocyanurate skeleton-containing urethane (meth)acrylate having a urethane bond and an isocyanurate skeleton-containing (meth)acrylate without a urethane bond.

6. The method for producing a molded body according to claim 5, wherein a proportion of the isocyanurate skeleton-containing urethane (meth)acrylate in the total weight of the isocyanurate skeleton-containing (meth)acrylate is 20 to 70 w %.

7. The method for producing a molded body according to claim 1, wherein the composition further contains silica.

8. The method for producing a molded body according to claim 7, wherein the silica is reactive silica.

9. The method for producing a molded body according to claim 1, wherein the cured product layer has a thickness of 1 to 40 µm.

10. The method for producing a molded body according to claim 1, wherein the substrate is a polycarbonate.

11. The method for producing a molded body according to claim 3, wherein a proportion of the alicyclic urethane (meth)acrylate component in the total of the alicyclic urethane (meth)acrylate and the isocyanurate skeleton-containing (meth)acrylate is 10 to 95 wt %.

12. The method for producing a molded body according to claim 2, wherein the composition further contains silica.

13. The method for producing a molded body according to claim 3, wherein the composition further contains silica.

14. The method for producing a molded body according to claim 2, wherein the cured product layer has a thickness of 1 to 40 µm.

15. The method for producing a molded body according to claim 3, wherein the cured product layer has a thickness of 1 to 40 µm.

16. The method for producing a molded body according to claim 2, wherein the substrate is a polycarbonate.

17. The method for producing a molded body according to claim 3, wherein the substrate is a polycarbonate.

18. The method for producing a molded body according to claim 3, wherein the isocyanurate skeleton-containing (meth)acrylate comprises an isocyanurate skeleton-containing urethane (meth)acrylate having a urethane bond and an isocyanurate skeleton-containing (meth)acrylate without a urethane bond.

19. The method for producing a molded body according to claim 18, wherein a proportion of the isocyanurate skeleton-containing urethane (meth)acrylate in the total weight of the isocyanurate skeleton-containing (meth)acrylate is 20 to 70 w %.

* * * * *